(12) United States Patent
Burnes et al.

(10) Patent No.: US 9,194,249 B2
(45) Date of Patent: Nov. 24, 2015

(54) METHOD FOR ENHANCING POWER OF A GAS TURBINE ENGINE

(71) Applicant: SOLAR TURBINES INCORPORATED, San Diego, CA (US)

(72) Inventors: Daniel William Burnes, San Diego, CA (US); Daniel Joseph Reitz, San Diego, CA (US); Jamaal A. Sanders, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 193 days.

(21) Appl. No.: 13/950,568

(22) Filed: Jul. 25, 2013

(65) Prior Publication Data

US 2015/0030428 A1 Jan. 29, 2015

(51) Int. Cl.
*F01D 17/16* (2006.01)
*F02C 9/20* (2006.01)

(52) U.S. Cl.
CPC ............... *F01D 17/162* (2013.01); *F02C 9/20* (2013.01)

(58) Field of Classification Search
CPC .... F01D 17/162; F02C 9/20; Y10T 29/49238
See application file for complete search history.

(56) References Cited

U.S. PATENT DOCUMENTS

| 5,794,432 | A | 8/1998 | Dunbar et al. |
| 5,931,636 | A | 8/1999 | Savage et al. |
| 8,251,647 | B2 | 8/2012 | Jarusel et al. |
| 2009/0232643 | A1 | 9/2009 | Norris et al. |

FOREIGN PATENT DOCUMENTS

| GB | 1085472 | 10/1967 |
| WO | WO 2010081751 | 7/2010 |

*Primary Examiner* — Moshe Wilensky
(74) *Attorney, Agent, or Firm* — Procopio, Cory, Hargreaves & Savitch LLP

(57) ABSTRACT

A method for servicing a gas turbine engine to enhance the power output of the gas turbine engine including a control system, inlet guide vanes, and a third stage power turbine nozzle is disclosed. The control system includes an inlet guide vane module. The method includes increasing an operating range of each inlet guide vane to at least 62 degrees. The method also includes modifying a total flow area of the third stage power turbine nozzle by 2% to 12%, the total flow area including flow areas between adjacent airfoils in the third stage power turbine nozzle.

23 Claims, 3 Drawing Sheets

METHOD FOR ENHANCING POWER OF A GAS TURBINE ENGINE

TECHNICAL FIELD

The present disclosure generally pertains to gas turbine engines, and is more particularly directed toward enhancing the power of a gas turbine engine.

BACKGROUND

Gas turbine engines include compressor, combustor, and turbine sections. The compressor section includes inlet guide vanes and the turbine section includes a third stage power turbine nozzle. A fuel system generally provides fuel to the combustor. A control system may control the angle of the inlet guide vanes and the amount of fuel delivered to the combustor by the fuel system.

U.S. Pat. No. 5,931,636 to J. Savage discloses a variable area turbine nozzle. The variable area turbine nozzle includes a plurality of circumferentially adjoining nozzle segments. Each nozzle segment includes outer and inner bands, with a plurality of first vane segments fixedly joined there between. A plurality of second vane segments join respective ones of the first vane segments to define therewith corresponding vanes which are spaced apart to define respective throats of minimum flow area for channeling there through combustion gas. The second vane segments are pivotable to selectively vary the throat area.

The present disclosure is directed toward overcoming one or more of the problems discovered by the inventors or that is known in the art.

SUMMARY OF THE DISCLOSURE

A method for servicing a gas turbine engine to enhance the power output of the gas turbine engine is disclosed. The gas turbine engine includes a control system, inlet guide vanes, and a third stage power turbine nozzle. The control system includes an inlet guide vane module, each inlet guide vane being rotatable about its axis. The third stage power turbine nozzle includes nozzle segments with an outer shroud, an inner shroud, and airfoils extending there between. The method includes increasing an operating range of each inlet guide vane to at least 62 degrees. The method also includes modifying a total flow area of the third stage power turbine nozzle by 2% to 12%, the total flow area including flow areas between adjacent airfoils in the third stage power turbine nozzle.

DETAILED DESCRIPTION

The systems and methods disclosed herein include a gas turbine engine including a compressor with variable inlet guide vanes, a combustor, and a turbine with multiple stages including a turbine nozzle and a turbine rotor assembly. The gas turbine engine also includes a control system that may be used to control, inter alia, the rotation angle of the inlet guide vanes and the amount of fuel delivered to the combustor. In embodiments, the control system is modified to increase the amount of rotation of the inlet guide vanes available during operation, and a flow area of the third stage turbine nozzle segments is increased for a standard day operation to enhance the power of the gas turbine engine. Similar modifications for cold day operation may also be made to enhance the power of the gas turbine engine.

Figure 1:
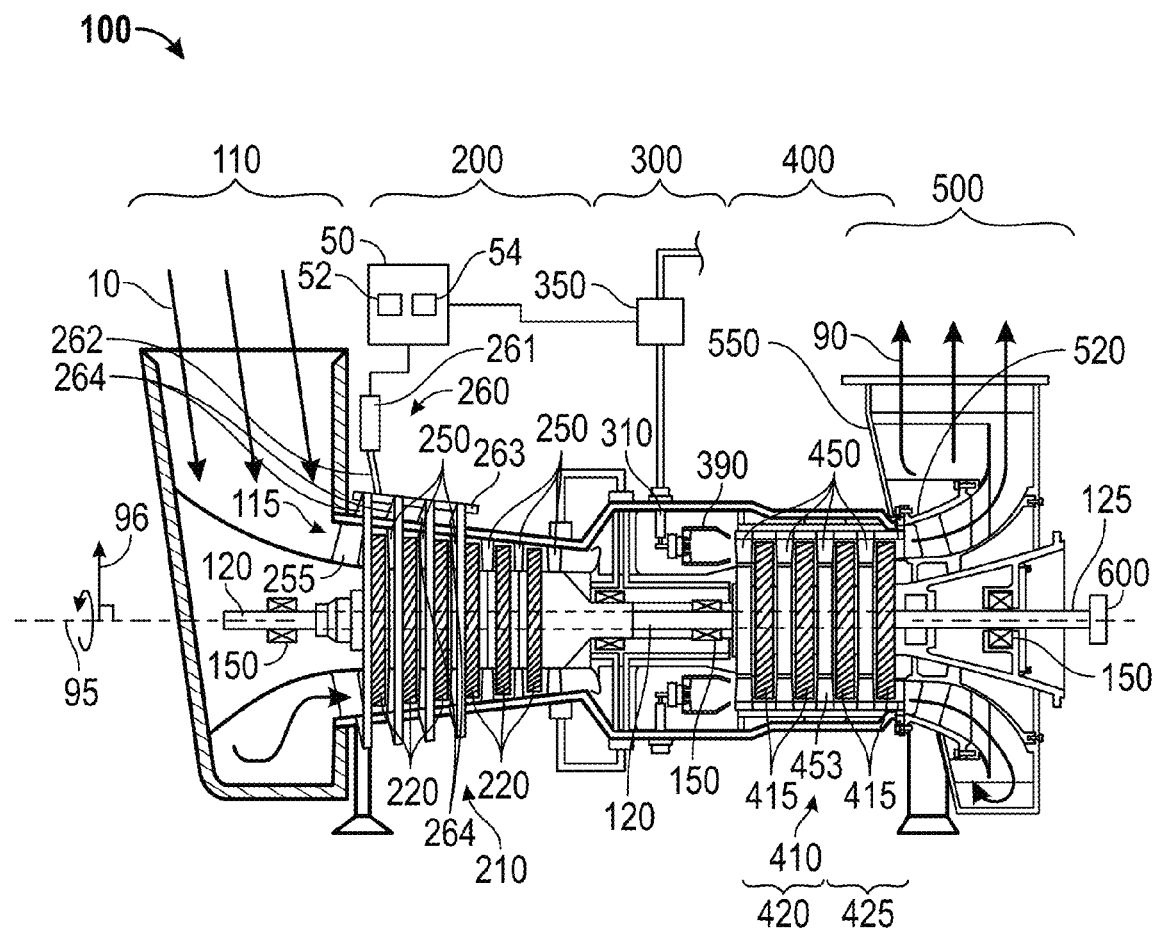
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a compressor 200, a combustor 300, a turbine 400, an exhaust 500, and a power output coupling 600.

The compressor 200 includes a compressor rotor assembly 210, compressor stationary vanes (stators) 250, and inlet guide vanes 255. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages.

Inlet guide vanes 255 axially precede the compressor stages. Inlet guide vanes 255 are variable guide vanes. Inlet guide vanes 255 may each be rotated about the axis of the inlet guide vane 255. Along with the inlet guide vanes 255, the first few stages of stators 250 may also be variable guide vanes. In the embodiment illustrated, compressor 200 includes three stages of stators 250 that include variable guide vanes located axially aft of inlet guide vanes 255, the three stages of stators being the first three stages of compressor 200.

Inlet guide vanes 255 may be rotated to modify or control the inlet flow area of the compressor 200 by an actuation system 260. Actuation system includes actuator 261, actuator arm 262, and a linkage system 263. Actuator 261 moves actuator arm 262 that moves or translates the components of the linkage system 263. The linkage system includes linkage arms 264. A linkage arm may be connected to each inlet guide vane 255 and each stator 250 variable guide vane. When actuator arm 262 is moved it causes each linkage arm 364 to be moved and rotate each inlet guide vane 255 and each stator 250 variable guide vane. The actuator 261, actuator arm 262, and linkage arms 264 may be coupled together and configured to rotate each variable guide vane the same amount.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may include one or more turbine disk assemblies 415. Turbine disk assemblies 415 each include a turbine disk that is circumferentially populated with turbine blades.

A turbine nozzle 450 axially precedes each of the turbine disk assemblies 415. Each turbine disk assembly 415 paired with the adjacent turbine nozzle 450 that precedes the turbine disk assembly 415 is considered a turbine stage. Turbine 400 includes multiple turbine stages.

Turbine 400 also includes a gas producer section 420 and a power turbine section 425. Gas producer section 420 and power turbine section 425 may each include one or more turbine stages.

Gas turbine engine 100 may include a single or dual shaft configuration. In the embodiment illustrated, gas turbine engine 100 includes a gas producer shaft 120 and a power turbine shaft 125. The gas producer shaft 120 mechanically couples to compressor rotor assembly 210 and to turbine disk assemblies 415 in gas producer section 420. The Power turbine shaft 125 couples to turbine disk assemblies 415 in power turbine section 425. Power turbine shaft 125 may also include power output coupling 600.

The exhaust 500 includes an exhaust diffuser 520 and an exhaust collector 550.

Gas turbine engine 100 includes a control system 50 including any number of controllers and modules for controlling and operating gas turbine engine 100 and the components and systems of gas turbine engine 100. Control system 50 may include inlet guide vane module 52 and fuel module 54. Inlet guide vane module 52 controls the relative angular position of each inlet guide vane 255 about its axis, as well as each variable guide vane about its access. Inlet guide vane module 52 may limit the rotation of each inlet guide vane 255 and each variable guide vane within a predetermined or preset operating range. The predetermined operating range may include a maximum limit relative to a predetermined or preset reference point and a minimum limit relative to the predetermined reference point. Fuel module 54 may control, inter alia, the amount and type of fuel delivered to the combustors.

The control system 50 may include an electronic control circuit having a central processing unit (CPU), such as a processor, or micro controller. Alternatively, the control system 50 may include programmable logic controllers or field-programmable gate arrays. The control system 50 may also include memory for storing computer executable instructions, which may be executed by the CPU. The memory may further store data related to controlling, inter alia, inlet guide vanes 255 and fuel system 350. The data may include, inter alia, the operating range of the inlet guide vanes 255 including the maximum limit, the minimum limit, and the reference point. The control system 50 may also include inputs and outputs to receive sensor signals and send control signals.

Figure 2:
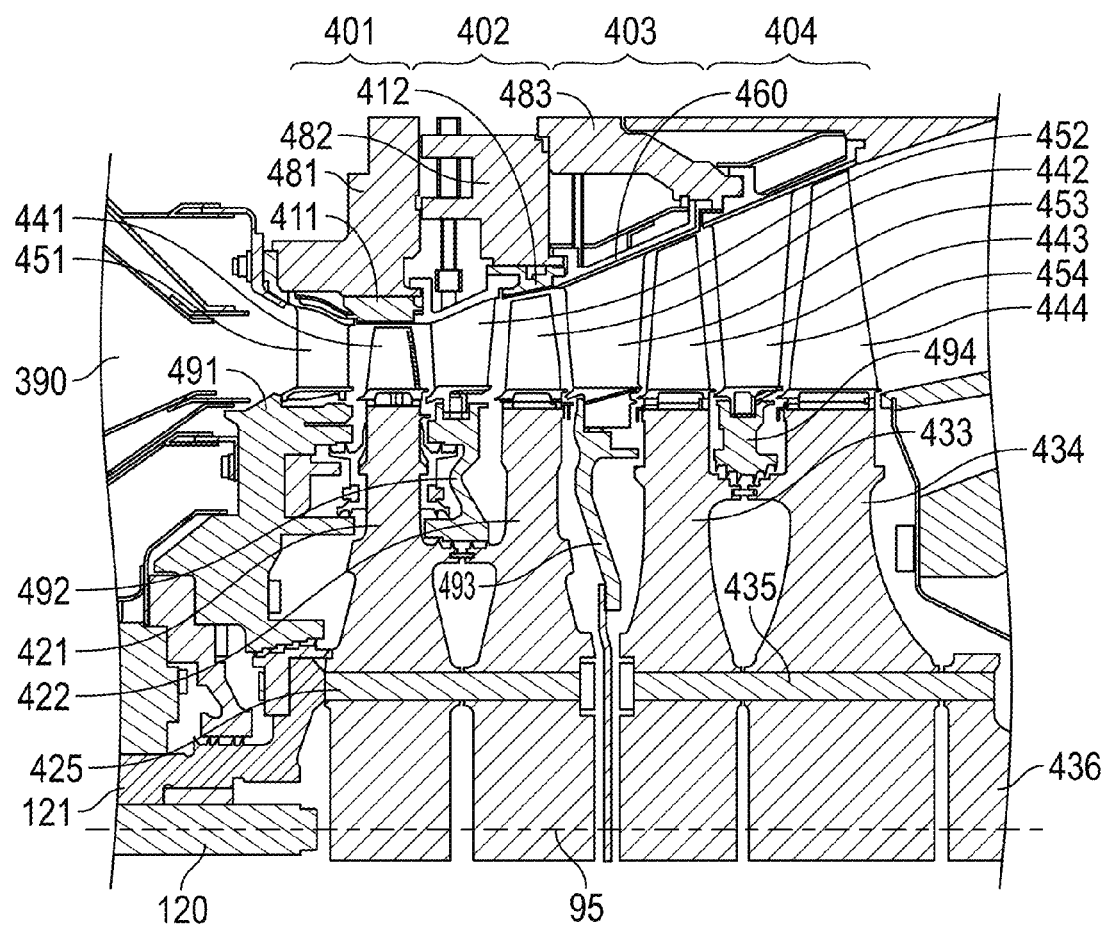
FIG. 2 is a cross-sectional view of a portion of the turbine of FIG. 1.

FIG. 2 is a cross-sectional view of a portion of the turbine 400 of FIG. 1. In the embodiment illustrated in FIG. 2, turbine 400 includes a first stage 401, a second stage 402, a third stage 403, and a fourth stage 404. First stage 401 and second stage 402 are part of gas producer section 420, while third stage 403 and fourth stage 404 are part of power turbine section 425. First stage 401 includes first stage turbine nozzle 451 proximate an exit of combustion chamber 390. First stage turbine nozzle 451 may be formed by multiple first stage nozzle segments (not shown). First stage turbine nozzle 451 may be supported by a first support assembly 481 located radially outward from first stage turbine nozzle 451 and a first stage diaphragm 491 located radially inward from first stage turbine nozzle 451.

First stage 401 also includes a turbine disk assembly 415 including first stage turbine blades 441 surrounding first stage turbine disk 421. First stage turbine blades 441 are axially aft and downstream of first stage turbine nozzle 451. First stage turbine disk 421 is connected or coupled to gas producer shaft 120.

Second stage 402 includes second stage turbine nozzle 452 axially aft and downstream of first stage turbine blades 441. Second stage turbine nozzle 452 may be formed by multiple second stage nozzle segments (not shown). Second stage turbine nozzle 452 may be supported by a second support assembly 482 located radially outward from second stage turbine nozzle 452 and a second stage diaphragm 492 located radially inward from second stage turbine nozzle 452.

Second stage 402 also includes a turbine disk assembly 415 including second stage turbine blades 442 surrounding second stage turbine disk 422. Second stage turbine blades 442 are axially aft and downstream of second stage turbine nozzle 452. Second stage turbine disk 422 is connected or coupled to gas producer shaft 120, first stage turbine disk 421, or both.

Third stage 403 includes third stage power turbine nozzle 453 axially aft and downstream of second stage turbine blades 442. Third stage power turbine nozzle 453 may be formed by multiple third stage turbine nozzle segments 460 (shown in FIG. 3). Third stage power turbine nozzle 453 may be supported by the second support assembly 482, a third support assembly 483, or both located radially outward from third stage power turbine nozzle 453, and a third stage diaphragm 493 located radially inward from third stage power turbine nozzle 453.

Third stage 403 also includes a turbine disk assembly 415 including third stage turbine blades 443 surrounding third stage turbine disk 433. Third stage turbine blades 443 are axially aft and downstream of third stage power turbine nozzle 453. Third stage turbine disk 433 is connected or coupled to power turbine shaft 125, a fourth stage turbine disk 434, or both.

Fourth stage 404 includes fourth stage turbine nozzle 454 axially aft and downstream of third stage turbine blades 443. Fourth stage turbine nozzle 454 may be formed by multiple fourth stage nozzle segments (not shown). Fourth stage turbine nozzle 454 may be supported by a third support assembly 483 located radially outward from fourth stage turbine nozzle 454 and a fourth stage diaphragm 494 located radially inward from fourth stage turbine nozzle 454.

Fourth stage 404 also includes a turbine disk assembly 415 including fourth stage turbine blades 444 surrounding fourth stage turbine disk 434. Fourth stage turbine blades 444 are axially aft and downstream of fourth stage turbine nozzle 454. Fourth stage turbine disk 434 is connected or coupled to power turbine shaft 125. Fourth stage turbine disk 434 may be connected or coupled to power turbine shaft 125 through a hub 435.

First support assembly 481, second support assembly 482, and third support assembly 483 may each be connected to or supported by turbine casing. Turbine casing may be the outer casing or shell of turbine 400. The various components of turbine 400 including, inter alia, the turbine disk assemblies 415, turbine nozzles 450, first stage diaphragm 491, second stage diaphragm 492, third stage diaphragm 493, and fourth stage diaphragm 494 may be coaxial or concentric to center axis 95.

Figure 3:
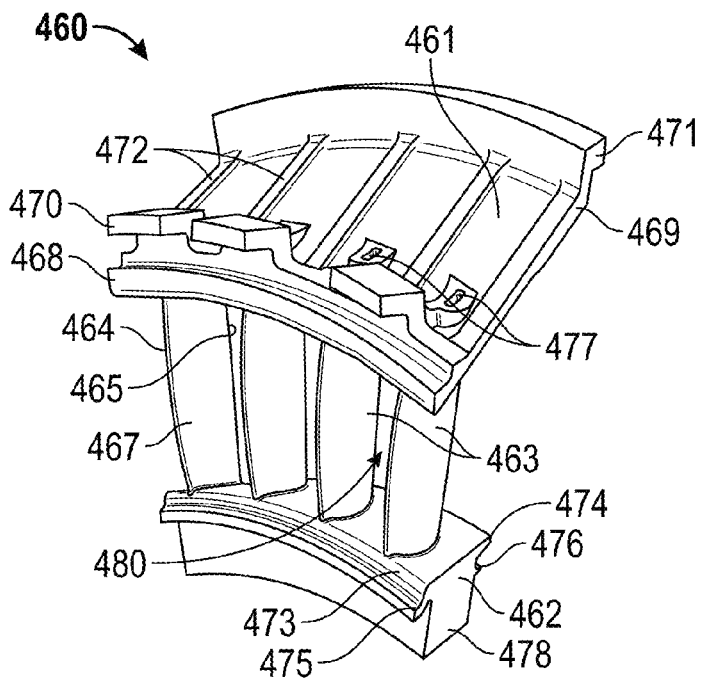
FIG. 3 is a perspective view of a third stage turbine nozzle segment for the power turbine section of FIG. 2.

FIG. 3 is a perspective view of a third stage turbine nozzle segment 460 for the power turbine section 425 of FIG. 2. Third stage turbine nozzle segment 460 includes outer shroud 461, inner shroud 462, and one or more airfoils 463. Outer shroud 461 may be a portion or a sector of an annular shape, such as a sector of a toroid or a sector of a conical frustum or funnel.

Outer shroud 461 includes an outer forward end 468 and an outer aft end 469. Outer forward end 468 is located upstream of outer aft end 469 and is located radially closer to inner shroud 462. Third stage turbine nozzle segment 460 may also include one or more forward hangers 470 and one or more aft hangers 471. In the embodiment illustrated, third stage turbine nozzle segment 460 includes three forward hangers 470 and a single aft hanger 471. Each forward hanger 470 includes an 'L' shaped cross-section extending radially outward from outer shroud 461 proximate or adjacent outer forward end 468 and then radially forward. Aft hanger 471 includes an 'L' shaped cross-section extending radially outward from or proximate to outer aft end 469 and then radially aft. In the embodiment illustrated, aft hanger 471 spans the length of outer aft end 469.

Third stage turbine nozzle segment 460 may also include ridges 472 extending radially outward from outer shroud 461 and spanning between outer forward end 468 and outer aft end 469. Ridges 472 may include a rectangular or cuboid shape. In the embodiment illustrated, third stage turbine nozzle segment 460 includes five equally spaced ridges 472 with a ridge 472 spanning each radial edge of third stage turbine nozzle segment 460.

Inner shroud 462 may be a portion or a sector of an annular shape, such as a sector of a toroid or a sector of a hollow cylinder. Inner shroud 462 is located radially inward from outer shroud 461. Inner shroud 462 includes an inner forward end 473 and an inner aft end 474. Inner forward end 473 may be axially aligned with outer forward end 468. Inner shroud 462 may be axially shorter than outer shroud 461, with inner aft end 474 being located axially forward of outer aft end 469.

Third stage turbine nozzle segment 460 may include a lip 475 extending radially inward and axially forward from inner shroud 462, proximate inner forward end 473. Third stage turbine nozzle segment 460 may also include a protrusion 476 extending axially aft from inner shroud 462 located radially inward from inner aft end 474.

Airfoils 463 extend between outer shroud 461 and inner shroud 462. Each airfoil 463 includes a leading edge 464, a trailing edge 465, a pressure side (not shown in FIG. 3), and a suction side 467. Leading edge 464 is the portion of the upstream end of each airfoil 463 with the maximum curvature and trailing edge 465 is the portion of the downstream end of each airfoil 463 with the maximum curvature. Leading edge 464 is proximate outer forward end 468 and inner forward end 473. Trailing edge 465 is proximate outer aft end 469 and inner aft end 474.

The pressure side extends from leading edge 464 to trailing edge 465 with a concave shape. Suction side 467 extends from leading edge 464 to trailing edge 465 with a convex shape. Cooling channels 477 may extend through outer shroud 461 and into airfoils 463.

Adjacent airfoils 463 along with outer shroud 461 and inner shroud 462 form a flow area 480 there between. The flow area 480 may be defined as the smallest area between adjacent airfoils 463. In embodiments, the flow area 480 is determined by the trailing edge 465 of one airfoil 463 and the portion of the suction side 467 of an adjacent airfoil 463 closest to the trailing edge 465.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid" and passes through inlet guide vanes 255. Inlet guide vanes 255 may control the amount of the working fluid that enters compressor 200. The working fluid is then compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly may be associated with a numbered stage. The stages that include stators 250 with variable guide vanes may also control the amount of the working fluid that enters compressor 200.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies 415. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

During operation of gas turbine engine 100 it may be desirable run gas turbine engine 100 at the maximum continuous turbine rotor inlet temperature (TRIT), i.e. temperature topping. It may also be desirable to run gas turbine engine 100 at the maximum continuous gas producer speed, i.e. speed topping. Control system 50 may sustain temperature and speed topping by modulating the fuel flow with fuel module 54 and by modulating the airflow through gas turbine engine 100 by rotating inlet guide vanes 255 and the variable guide vanes with inlet guide vane module 52.

If either the airflow or fuel flow reaches a maximum limit, control system 50 may not be able to simultaneously sustain both temperature and speed topping. If the inlet guide vanes 255 reach a maximum limit, and cannot be opened or modulated, or if flow areas 480 of third stage turbine nozzle segments 460 is too small, the airflow may be restricted through gas turbine engine 100, which may reduce TRIT while speed topping is sustained. Modifying gas turbine engine 100 to increase the airflow or flow capacity through gas turbine engine 100 may sustain an increase in the maximum continuous TRIT. Opening both the inlet guide vanes 255 and the flow area 480 may optimize and enhance the power of gas turbine engine 100 in general operation, or standard day operation.

In colder climates, the flow area 480 may need to be modified differently than the flow area 480 for warmer climates in order to sustain temperature topping and speed topping for the maximum continuous TRIT. The flow area 480 in colder climates may need to be smaller than the flow area 480 in warmer or standard climates. The smaller flow area 480 for colder days may allow the inlet guide vanes 255 to modify the flow capacity by continuing to open up, allowing gas turbine engine 100 to stay speed and temperature topped at lower temperatures, which may optimize and enhance the power of gas turbine engine 100 for operation in the colder climates, or in cold day operation.

Figure 4:
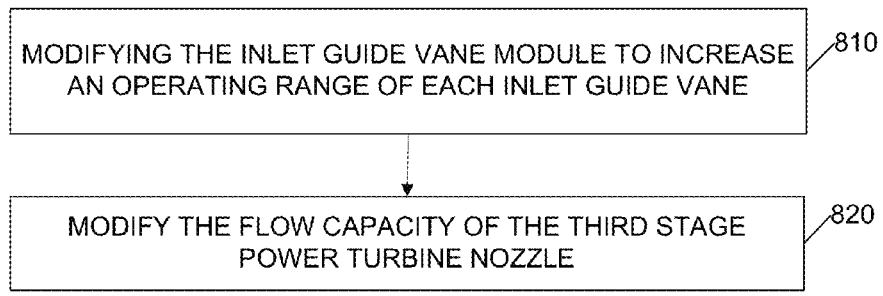
FIG. 4 is a flowchart of a method for servicing the gas turbine engine of FIG. 1 to enhance the power output of the gas turbine engine.

FIG. 4 is a flowchart of a method for servicing the gas turbine engine 100 of FIG. 1 to enhance the power output of the gas turbine engine 100. The method includes modifying the inlet guide vane module 52 to increase an operating range of each inlet guide vane 255 at step 810. Modifying the inlet guide vane module 52 may include changing the control and actuation of the inlet guide vanes 255 and the variable guide vanes. The reference for the control may be the inlet guide vanes 255. However, the increase in the controlled operating range may apply to all variable guide vanes. In one embodiment, the increase is from two to four degrees. In embodiments, the operating range may be increased to at least 62 degrees; the operating range may be increased from 58-60 degrees. In another embodiment, the operating range is increased to 62 degrees.

In embodiments, the modification includes modifying the operating range to include a minimum limit of −52 and a maximum limit of 10 degrees relative to a predetermined reference point. In one embodiment, the maximum limit is increased from 6-8 degrees relative to the predetermined reference point to 10 degrees relative to the predetermined reference point. In another embodiment, the maximum limit is increased from 6 degrees relative to the predetermined reference point to 10 degrees relative to the predetermined reference point. In yet another embodiment, the operating range is increased 8 degrees relative to the predetermined reference point to 10 degrees relative to the predetermined reference point.

Modifying the operating range may include changing stored values for the maximum limit and the minimum limit in the inlet guide vane module 52, which may include, inter alia, changing values in a table stored in the inlet guide vane module. Modifying the inlet guide vane module 52 to increase the maximum limit may allow the inlet guide vanes 255 to open to the full open position. In some embodiments, the full open position may be at the hardware limit for opening inlet guide vanes 255 and the stators 250 with variable guide vanes.

The method also includes modifying the flow capacity of the third stage power turbine nozzle 453 at step 820. Modifying the total flow capacity may include modifying the total flow area of the third stage power turbine nozzle 453, including each flow area 480 between adjacent airfoils 463 of each third stage turbine nozzle segment 460. Modifying the total flow capacity and total flow area of the third stage power turbine nozzle 453 may include removing the third stage turbine nozzle segments 460, and either replacing the third stage turbine nozzle segments 460 with new third stage turbine nozzle segments 460 with the modified flow capacity and flow area or bending the trailing edge 465 of each airfoil 463 of the third stage turbine nozzle segment 460 to the modified flow capacity and flow area prior to reinstalling the third stage turbine nozzle segments 460.

Nozzle segments 460 can have the flow area or effective area modified through a process called nozzle bending. The effective area can either be increased or decreased by opening or closing the distance between airfoils 463 at the trailing edge 465 of each airfoil 463. This may be accomplished through a process of bending with a bending tool and measuring with a volume displacement gage (VDG). The bending tool grips around the trailing edge 465 on both the pressure and suction sides 467 and is attached to a leverage bar for hand operation. The VDG may be a tool with evenly spaced retractable pins that is inserted into the flow area 480 along the length of the trailing edge 465. In one embodiment, the VDG includes five retractable pins. The retractable pins each measure the distance from the tool edge to the pressure side of the trailing edge 465 of the adjacent airfoil 463. These distance values may be averaged to determine the volume displacement and the VDG displays a value that correlates to effective area. The operator may slide the bending tool on to the trailing edge 465 and manually raise or lower the bar which increases or reduces the effective area. The operator may then use the VDG tool to determine if the adjusted area is within a specification range. This process may iterate until the flow areas 480 of each nozzle segment 460 are set as desired.

In many of the embodiments described below, the equivalent airflow is provided for the flow capacity in units of kilograms per second (pounds per second). In other embodiments, flow capacity may be defined in, inter alia, referred airflow or a non-dimensional flow. In one embodiment, the flow capacity may be modified by an amount, the amount may be from 0.14 kilograms per second (0.31 pounds per second) to 0.55 kilograms per second (1.22 pounds per second) or by 1% to 4%; the flow area may be modified by an amount, the amount may be from 11.6 square centimeters (1.8 square inches) to 77.4 square centimeters (12.0 square inches) or by 2% to 12%. In another embodiment, the flow capacity is modified by 1.0% to 3.0% and the flow area is modified by 2.5% to 6%.

In some embodiments, the total flow capacity and total flow area may be increased for standard day operations. In one of these embodiments, the total flow capacity is increased from within a range of 13.65 kilograms per second (30.1 pounds per second)-13.74 kilograms per second (30.3 pounds per second) to within a range of 14.06 kilograms per second (31.0 pounds per second)-14.15 kilograms per second (31.2 pounds per second), which may correspond to an increase of the total flow area from within a range of 567.7 square centimeters (88 square inches) -580.6 square centimeters (90 square inches) to within a range of 600 square centimeters (93 square inches)-612.9 square centimeters (95 square inches). In another embodiment, the total flow capacity is increased from 13.69 kilograms per second (30.19 pounds per second) to 14.10 kilograms per second (31.08 pounds per second), which may correspond to an increase of the total flow area from 572.9 square centimeters (88.8 square inches) to 606.5 square centimeters (94.0 square inches).

In another of these embodiments, the total flow capacity is increased from within a range of 14.06 kilograms per second (31.0 pounds per second)-14.15 kilograms per second (31.2 pounds per second) to within a range of 14.42 kilograms per second (31.8 pounds per second)-14.52 kilograms per second (32.0 pounds per second), which may correspond to an increase of the total flow area from within a range of 600 square centimeters (93 square inches)-612.9 square centimeters (95 square inches) to within a range of 670.9 square centimeters (104 square inches)-683.9 square centimeters (106 square inches). In another embodiment, the total flow capacity is increased from 14.10 kilograms per second (31.08 pounds per second) to 14.49 kilograms per second (31.94 pounds per second), which may correspond to an increase of the total flow area from 606.5 square centimeters (94.0 square inches) to 909.0 square centimeters (104.9 square inches).

In yet another of these embodiments, the total flow capacity is increased from within a range of 13.93 kilograms per second (30.7 pounds per second)-14.02 kilograms per second (30.9 pounds per second) to a within range of 14.33 kilograms per second (31.6 pounds per second)-14.42 kilograms per second (31.8 pounds per second), which may correspond to an increase of the total flow area from within a range of 590.3 square centimeters (91.5 square inches)-603.2 square centimeters (93.5 square inches) to within a range of 625.8 square centimeters (97.0 square inches)-638.7 square centimeters (99.0 square inches). In another embodiment, the total flow capacity is increased from 13.97 kilograms per second (30.79 pounds per second) to 14.38 kilograms per second (31.70 pounds per second), which may correspond to an increase of the total flow area from 595.5 square centimeters (92.3 square inches) to 631.0 square centimeters (97.8 square inches).

In some embodiments, the total flow capacity and total flow area of the third stage power turbine nozzle 453 may be decreased for cold day operations. In one of these embodiments, the total flow capacity is decreased from within a range of 13.65 kilograms per second (30.1 pounds per second)-13.74 kilograms per second (30.3 pounds per second) to within a range of 13.25 kilograms per second (29.2 pounds per second)-13.34 kilograms per second (29.4 pounds per second), which may correspond to a decrease of the total flow area from within a range of 567.7 square centimeters (88 square inches)-580.6 square centimeters (90 square inches) to within a range of 532.2 square centimeters (82.5 square inches)-545.2 square centimeters (84.5 square inches). In another embodiment, the total flow capacity is decreased from 13.69 kilograms per second (30.19 pounds per second) to 13.29 kilograms per second (29.30 pounds per second), which may correspond to a decrease of the total flow area from 572.9 square centimeters (88.8 square inches) to 539.4 square centimeters (83.6 square inches).

In another of these embodiments, the total flow capacity is decreased from within a range of 14.06 kilograms per second (31.0 pounds per second)-14.15 kilograms per second (31.2 pounds per second) to within a range of 13.65 kilograms per second (30.1 pounds per second)-13.74 kilograms per second (30.3 pounds per second), which may correspond to a decrease of the total flow area from within a range of 600 square centimeters (93 square inches) -612.9 square centimeters (95 square inches) to within a range of 567.7 square centimeters (88 square inches)-580.6 square centimeters (90 square inches). In another embodiment, the total flow capacity is decreased from 14.10 kilograms per second (31.08 pounds per second) to 13.69 kilograms per second (30.19 pounds per second), which may correspond to a decrease of the total flow area from 606.5 square centimeters (94.0 square inches) to 572.9 square centimeters (88.8 square inches).

In yet another of these embodiments, the total flow capacity is decreased from within a range of 13.93 kilograms per second (30.7 pounds per second)-14.02 kilograms per second (30.9 pounds per second) to within a range of 13.74 kilograms per second (30.3 pounds per second)-13.83 kilograms per second (30.5 pounds per second), which may correspond to a decrease of the total flow area from within a range of 590.3 square centimeters (91.5 square inches)-603.2 square centimeters (93.5 square inches) to within a range of 574.2 square centimeters (89.0 square inches)-587.1 square centimeters (91.0 square inches). In another embodiment, the total flow capacity is decreased from 13.97 kilograms per second (30.79 pounds per second) to 13.77 kilograms per second (30.68 pounds per second), which may correspond to an decrease of the total flow area from 595.5 square centimeters (92.3 square inches) to 579.4 square centimeters (89.8 square inches).

Figure 5:
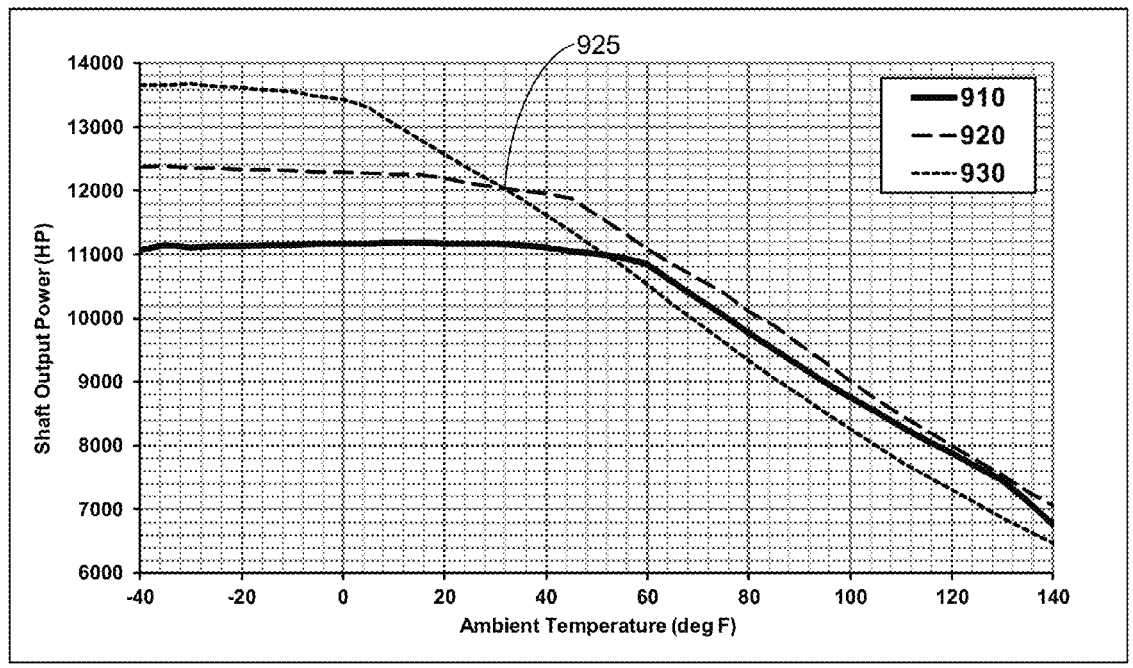
FIG. 5 is a performance chart illustrating the power output versus the ambient temperature for embodiments of a serviced gas turbine engine of FIG. 1.

FIG. 5 is a performance chart illustrating the power output versus the ambient temperature for embodiments of a serviced gas turbine engine 100 of FIG. 1. The performance chart includes a line for the current production configuration 910, a line for the standard day configuration 920 modified from the current production configuration 910, and a line for the cold day configuration 930 modified from the current production configuration 910. For the performance chart illustrated, the data was recorded at an elevation of zero feet and with a relative humidity of 60%.

For the modification from the current production configuration 910 to the standard day configuration 920 illustrated, the shaft output power is increased/improved over the current production configuration 910 at all temperatures between −40 to 140 degrees Fahrenheit. For the modification from the current production configuration 910 to the cold day configuration 930 illustrated, the shaft output power is increased/improved over the current production configuration 910 for temperatures below approximately 52 degrees Fahrenheit.

The standard day configuration 920 operates at a higher shaft output power than the cold day configuration 930 at temperatures above approximately 32 degrees Fahrenheit, while the cold day configuration 930 operates at a higher shaft output power than the standard day configuration 910 at temperatures below approximately 32 degrees. Thus, for climates where gas turbine engine 100 may operate predominately at temperatures less than approximately 32 degrees Fahrenheit may be considered a colder climate and the cold day configuration/modification may be used, while climates where gas turbine engine 100 may operate predominately at temperatures greater than approximately 32 degrees Fahrenheit may be considered a standard climate and the standard day configuration/modification may be used. In other embodiments, the shaft output power for the standard day configuration 920 and the cold day configuration 930 may include a different crossing point 925. In those embodiments, the crossing point may determine when the cold day configuration/modification is used and when the standard day configuration/modification is used.

The servicing disclosed herein may result in a relatively inexpensive improvement to the existing power output of gas turbine engine 100 by changing the control strategy and modifying one part or one turbine nozzle stage. The servicing may include, inter alia, overhauling, field modifying, or refurbishing gas turbine engine 100.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for servicing a gas turbine engine to enhance the power output of the gas turbine engine, the gas turbine engine including a control system, inlet guide vanes, and a third stage power turbine nozzle, the control system including an inlet guide vane module, each inlet guide vane being rotatable about its axis, and the third stage power turbine nozzle including nozzle segments with an outer shroud, an inner shroud, and airfoils extending there between, the method comprising:

increasing an operating range of each inlet guide vane to at least 62 degrees, the operating range including a maximum limit relative to a predetermined reference point and a minimum limit relative to the predetermined reference point and increasing the operating range of each inlet guide vane includes increasing the maximum limit by two to four degrees; and modifying a total flow area of the third stage power turbine nozzle by an amount, the amount being from 11.6 square centimeters to 77.4 square centimeters and the total flow area including flow areas between adjacent airfoils in the third stage power turbine nozzle.

2. The method of claim 1, wherein increasing the operating range of each inlet guide vane includes modifying the operating range such that the minimum limit is −52 degrees and the maximum limit is 10 degrees.

3. The method of claim 1, wherein modifying the total flow area of the third stage power turbine nozzle includes increasing the total flow area of the third stage power turbine nozzle from within a range of 567.7 square centimeters-580.6 square centimeters to within a range of 600 square centimeters-612.9 square centimeters.

4. The method of claim 1, wherein modifying the total flow area of the third stage power turbine nozzle includes increasing the total flow area of the third stage power turbine nozzle from within a range of 600 square centimeters-612.9 square centimeters to within a range of 670.9 square centimeters-683.9 square centimeters.

5. The method of claim 1, wherein modifying the total flow area of the third stage power turbine nozzle includes increasing the total flow area of the third stage power turbine nozzle from within a range of 590.3 square centimeters-603.2 square centimeters to within a range of 625.8 square centimeters-638.7 square centimeters.

6. The method of claim 1, wherein modifying the total flow area of the third stage power turbine nozzle includes decreasing the total flow area of the third stage power turbine nozzle from within a range of 567.7 square centimeters-580.6 square centimeters to within a range of 532.2 square centimeters-545.2 square centimeters.

7. The method of claim 1, wherein modifying the total flow area of the third stage power turbine nozzle includes decreasing the total flow area of the third stage power turbine nozzle from within a range of 600 square centimeters-612.9 square centimeters to within a range of 567.7 square centimeters-580.6 square centimeters.

8. The method of claim 1, wherein modifying the total flow area of the third stage power turbine nozzle includes decreasing the total flow area of the third stage power turbine nozzle from within a range of 590.3 square centimeters-603.2 square centimeters to within a range of 574.2 square centimeters-587.1 square centimeters.

9. The method of claim 1, wherein modifying the total flow area of the third stage power turbine nozzle includes bending a trailing edge of one or more airfoils of the third stage power turbine nozzle.

10. A method for servicing a gas turbine engine to enhance the power output of the gas turbine engine, the gas turbine engine including a control system, inlet guide vanes, and a third stage power turbine nozzle, the control system including an inlet guide vane module, each inlet guide vane being rotatable about its axis, and the third stage power turbine nozzle including nozzle segments with an outer shroud, an inner shroud, and airfoils extending there between, the method comprising:

modifying the inlet guide vane module to increase an operating range of rotation for each inlet guide vane about its axis to at least 62 degrees; and modifying a total flow capacity of the third stage power turbine nozzle by 1% to 4%, the total flow capacity including flow capacities between adjacent airfoils in the third stage power turbine nozzle.

11. The method of claim 10, wherein modifying the inlet guide vane module to increase the operating range of rotation for each inlet guide vane about its axis includes modifying the inlet guide vane module to rotate each inlet guide vane from a minimum limit of −52 degrees relative to a predetermined reference point to a maximum limit of 10 degrees relative to the predetermined reference point.

12. The method of claim 10, wherein modifying the total flow capacity of the third stage power turbine nozzle includes increasing the total flow capacity of the third stage power turbine nozzle from within a range of 13.65 kilograms per second-13.74 kilograms per second to within a range of 14.06 kilograms per second-14.15 kilograms per second.

13. The method of claim 10, wherein modifying the total flow capacity of the third stage power turbine nozzle includes increasing the total flow capacity of the third stage power turbine nozzle from within a range of 14.06 kilograms per second-14.15 kilograms per second to within a range of 14.42 kilograms per second-14.52 kilograms per second.

14. The method of claim 10, wherein modifying the total flow capacity of the third stage power turbine nozzle includes increasing the total flow capacity of the third stage power turbine nozzle from within a range of 13.93 kilograms per second-14.02 kilograms per second to a within range of 14.33 kilograms per second-14.42 kilograms per second.

15. The method of claim 10, wherein modifying the total flow capacity of the third stage power turbine nozzle includes decreasing the total flow capacity of the third stage power turbine nozzle from within a range of 13.65 kilograms per second-13.74 kilograms per second to within a range of 13.25 kilograms per second-13.34 kilograms per second.

16. The method of claim 10, wherein modifying the total flow capacity of the third stage power turbine nozzle includes decreasing the total flow capacity of the third stage power turbine nozzle from within a range of 14.06 kilograms per second-14.15 kilograms per second to within a range of 13.65 kilograms per second-13.74 kilograms per second.

17. The method of claim 10, wherein modifying the total flow capacity of the third stage power turbine nozzle includes decreasing the total flow capacity of the third stage power turbine nozzle from within a range of 13.93 kilograms per second-14.02 kilograms per second to within a range of 13.74 kilograms per second-13.83 kilograms per second.

18. The method of claim 10, wherein modifying the total flow capacity of the third stage power turbine nozzle includes bending a trailing edge of one or more airfoils of the third stage power turbine nozzle.

19. A method for servicing a gas turbine engine to enhance the power output of the gas turbine engine, the gas turbine engine including a control system, inlet guide vanes, and a third stage power turbine nozzle, the control system including an inlet guide vane module, each inlet guide vane being rotatable about its axis, and the third stage power turbine nozzle including nozzle segments with an outer shroud, an inner shroud, and airfoils extending there between, the method comprising:
  modifying the inlet guide vane module to increase an operating range of rotation for each inlet guide vane about its axis to at least 62 degrees; and
  modifying a total flow area of the third stage power turbine nozzle by 2% to 12%, the total flow area including flow areas between adjacent airfoils in the third stage power turbine nozzle.

20. The method of claim 19, wherein modifying the inlet guide vane module to increase the operating range of rotation for each inlet guide vane includes modifying the inlet guide vane module to control the rotation of each inlet guide vane from a minimum limit of −52 degrees relative to a predetermined reference point to a maximum limit of 10 degrees relative to the predetermined reference point.

21. The method of claim 19, wherein the total flow area of the third stage power turbine nozzle is modified by 2.5% to 6%.

22. The method of claim 19, further comprising:
  modifying a total flow capacity of the third stage power turbine nozzle by 1% to 4%, the total flow capacity including flow capacities between adjacent airfoils in the third stage power turbine nozzle.

23. The method of claim 19, wherein modifying the total flow area of the third stage power turbine nozzle includes bending a trailing edge of one or more airfoils of the third stage power turbine nozzle.

* * * * *